(12) United States Patent
Odamura et al.

(10) Patent No.: US 7,704,576 B2
(45) Date of Patent: Apr. 27, 2010

(54) THERMAL TRANSFER SHEET, PROCESS FOR PRODUCING THE SAME, AND IMAGE FORMED OBJECT PRODUCED BY TRANSFER OF SAID THERMAL TRANSFER SHEET

(75) Inventors: Kouzou Odamura, Shinjuku-Ku (JP); Satoshi Yamada, Shinjuku-Ku (JP); Koji Eto, Shinjuku-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 836 days.

(21) Appl. No.: 10/584,723

(22) PCT Filed: Dec. 16, 2004

(86) PCT No.: PCT/JP2004/018783

§ 371 (c)(1),
(2), (4) Date: Jun. 26, 2006

(87) PCT Pub. No.: WO2005/068218

PCT Pub. Date: Jul. 28, 2005

(65) Prior Publication Data
US 2007/0160912 A1    Jul. 12, 2007

(30) Foreign Application Priority Data
Dec. 24, 2003   (JP)  ............................. 2003-426702

(51) Int. Cl.
*B41M 5/42* (2006.01)
(52) U.S. Cl. .................. 428/32.77; 283/86; 359/1; 428/32.51; 428/32.78; 428/32.79
(58) Field of Classification Search .................. None
See application file for complete search history.

(56) References Cited

U.S. PATENT DOCUMENTS

| 6,290,798 B1 * | 9/2001 | Onishi et al. ................ 156/230 |
| 2002/0015897 A1 | 2/2002 | Toshine et al. |

FOREIGN PATENT DOCUMENTS

| JP | 08-118826 | 5/1996 |
| JP | 10-116031 | 5/1998 |
| JP | 2002-79797 | 3/2002 |
| JP | 2003-53898 | 2/2003 |
| JP | 2003-220769 | 8/2003 |

* cited by examiner

*Primary Examiner*—Bruce H Hess
(74) *Attorney, Agent, or Firm*—Durr & Brown

(57) ABSTRACT

This invention provides a hologram thermal transfer sheet that can realize thermal transfer treatment with high efficiency. The thermal transfer sheet comprises a base material sheet and a transparent transfer layer provided separably on the base material sheet, characterized in that a hologram layer is provided on at least a part of the transparent transfer layer. There are also provided a process for producing the thermal transfer sheet and an image formed material produced by the transfer of this thermal transfer sheet.

9 Claims, 6 Drawing Sheets

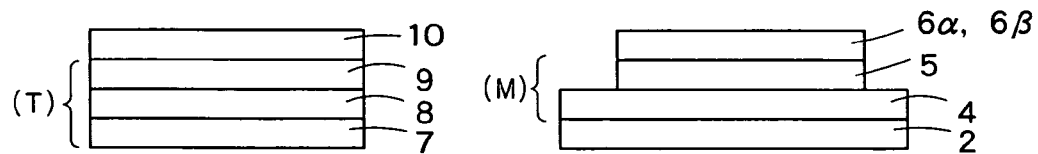
F I G. 3(a)
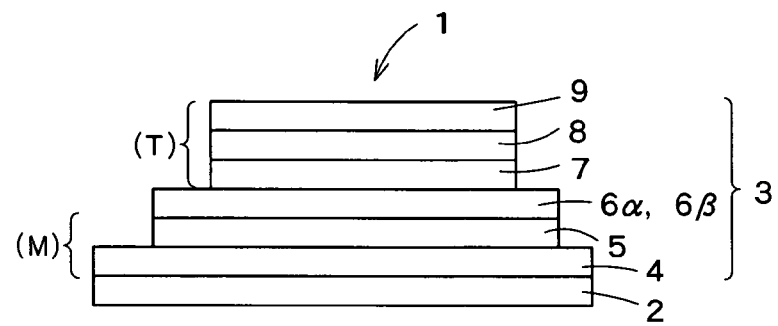
F I G. 3(b)
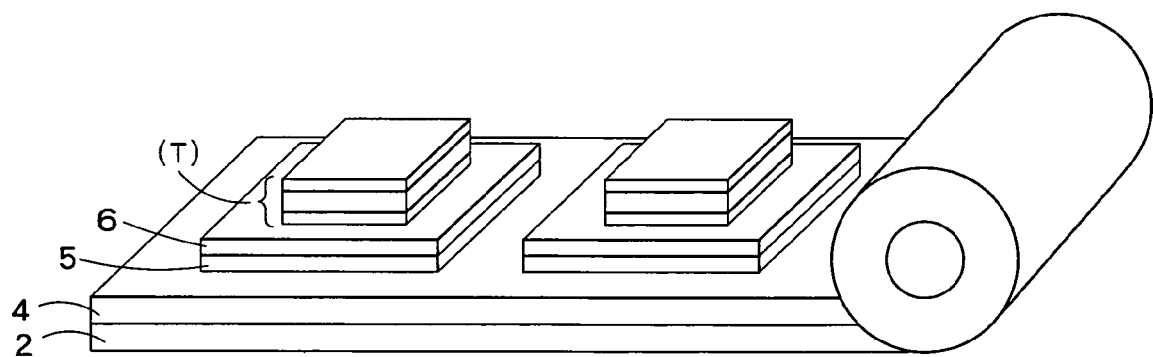
F I G. 3(c)

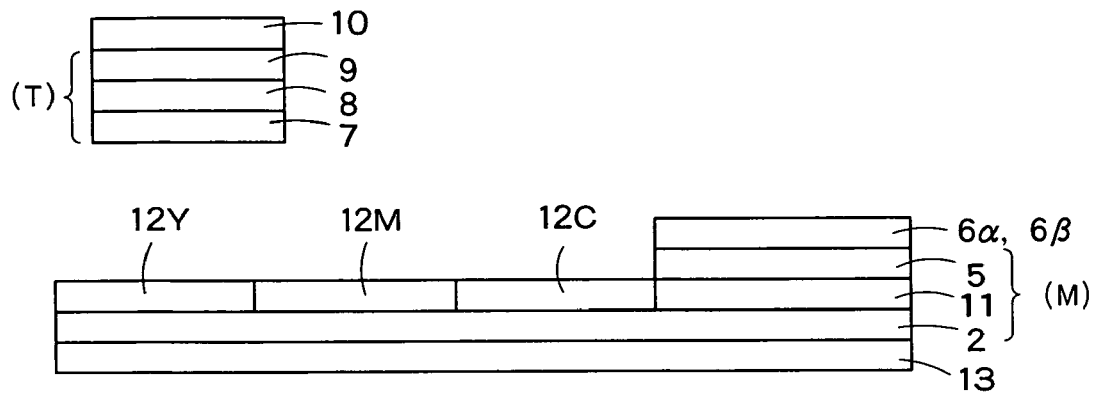
F I G. 4(a)
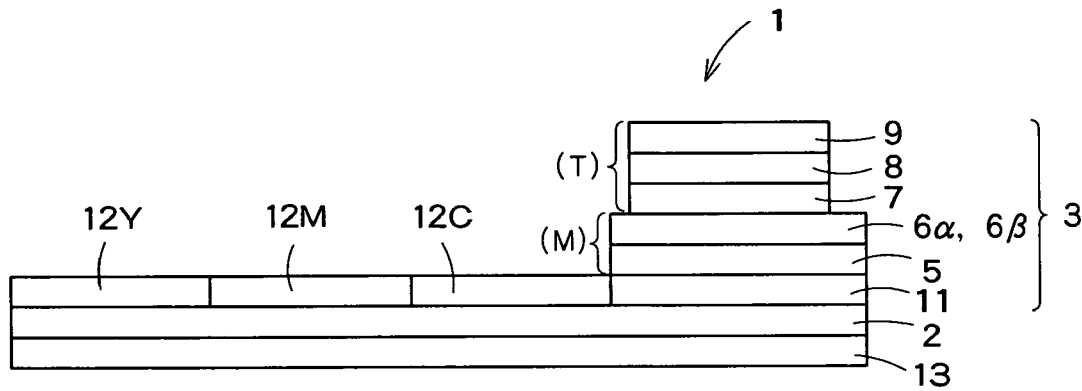
F I G. 4(b)
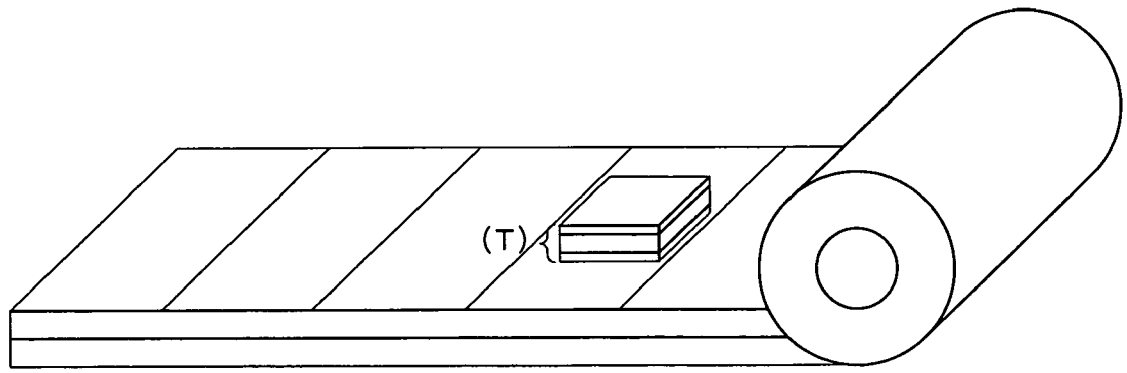
F I G. 4(c)

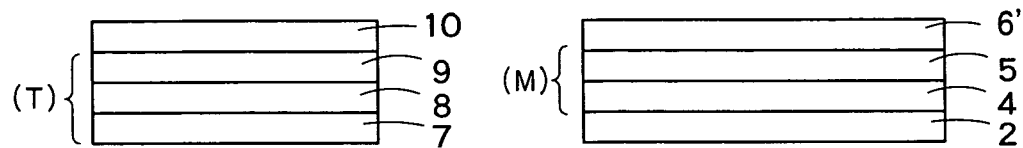
F I G. 5(a)
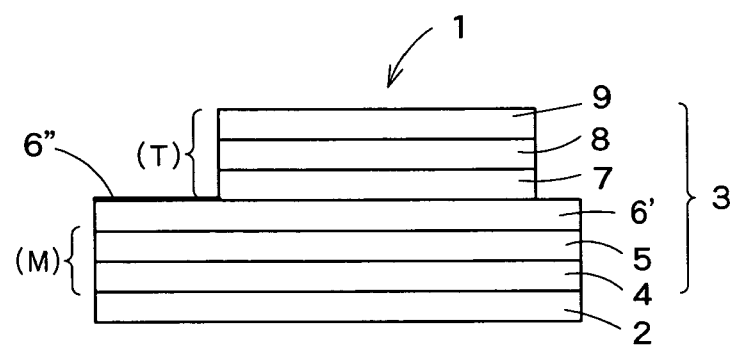
F I G. 5(b)
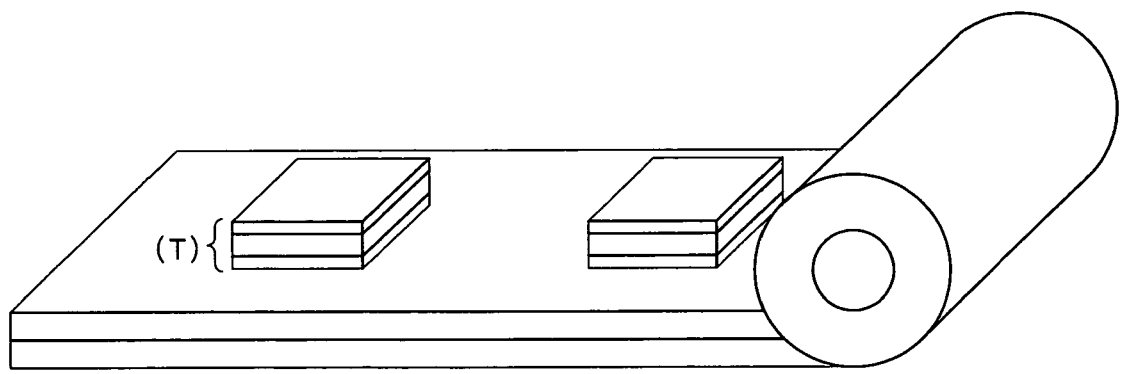
F I G. 5(c)

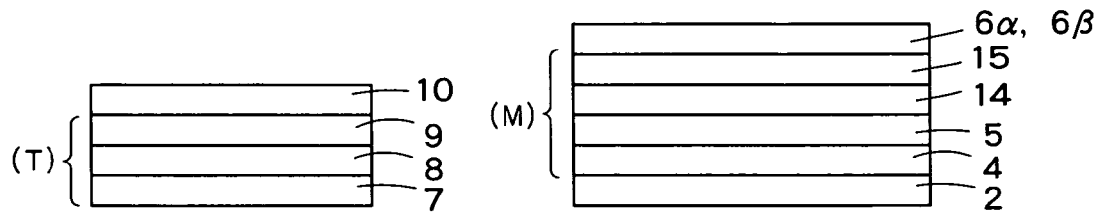
F I G. 6(a)
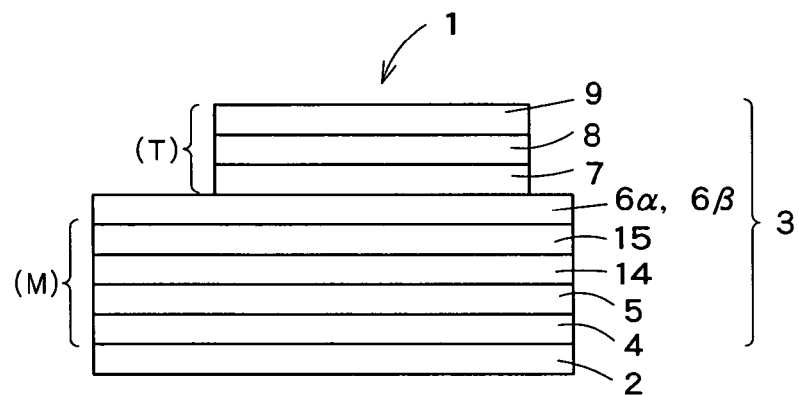
F I G. 6(b)
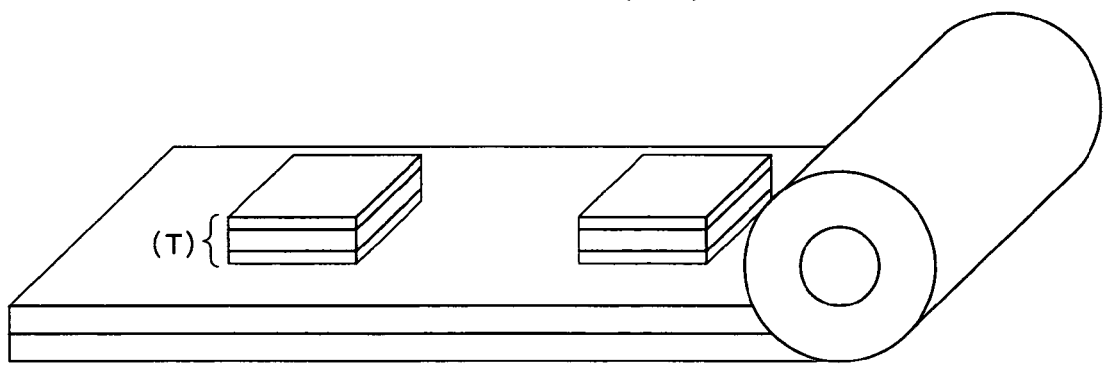
F I G. 6(c)

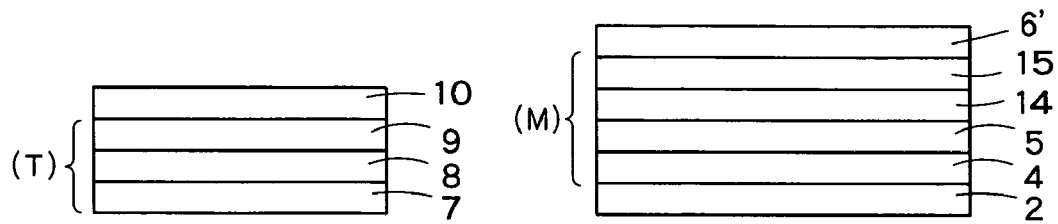
F I G. 7(a)
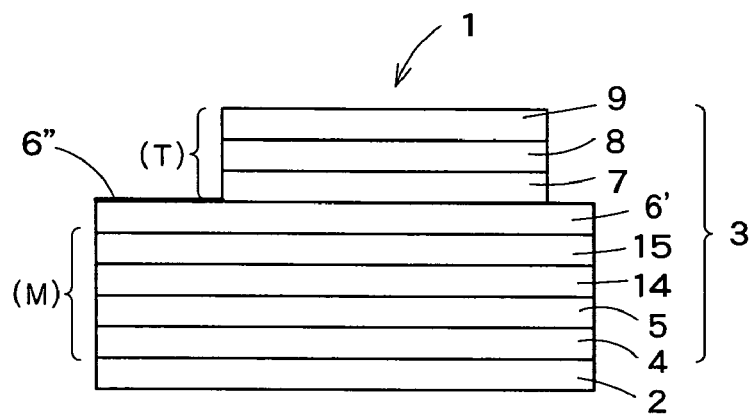
F I G. 7(b)
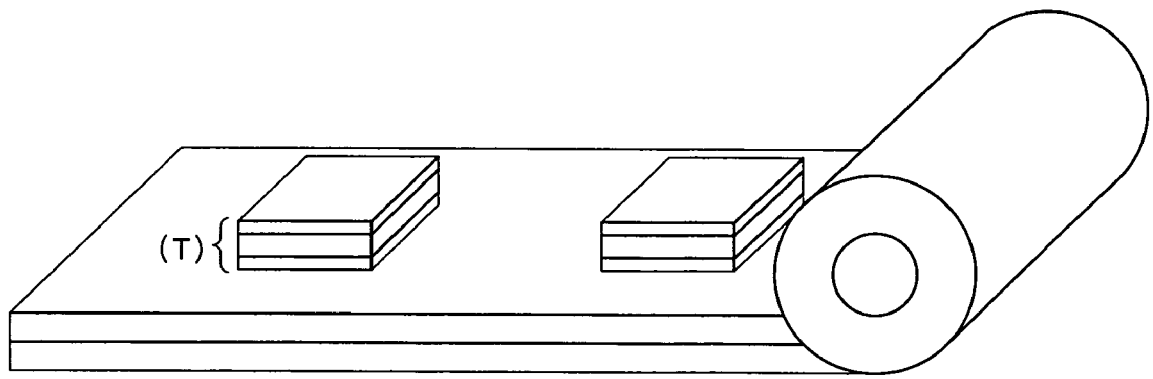
F I G. 7(c)

THERMAL TRANSFER SHEET, PROCESS FOR PRODUCING THE SAME, AND IMAGE FORMED OBJECT PRODUCED BY TRANSFER OF SAID THERMAL TRANSFER SHEET

TECHNICAL FIELD

The present invention relates to a thermal transfer sheet. More particularly, the present invention relates to a thermal transfer sheet that can easily transfer a hologram having an excellent forgery preventive function, a process for producing the same, and an image formed object produced by the transfer of this thermal transfer sheet.

BACKGROUND ART

Holograms is generally a record of an interference pattern of light and can realize visual perception of a change in color and three-dimensional images depending upon a light source or viewing angle. An advanced technique is required for the formation of the hologram, and even a slight distortion of the hologram image is visually easily perceived. Therefore, holograms have hitherto been utilized, for example, for preventing forgery or alteration of articles such as credit cards, bank cards, and ID cards.

DISCLOSURE OF THE INVENTION

Problems to be Solved by the Invention

In order to prevent forgery and alteration of information described in credit cards, bank cards, ID cards and the like and to protect a volume hologram layer provided on the surface of these cards and the like, a protective layer should be provided for hologram and information protection purposes. In the conventional technique, however, the step of forming a protective layer should be provided as a separate step after the step of describing information on a card surface and the step of forming a hologram on the card. Accordingly, the production of the protected articles on a mass production basis with high efficiency is difficult.

Means for Solving the Problems

The present inventors can solve the above problems of the prior art.

According to the present invention, there is provided a thermal transfer sheet comprising:

a base material sheet; and a transparent transfer layer provided separably on the base material sheet, wherein a hologram layer is provided on at least a part of the transparent transfer layer.

In a preferred embodiment of the present invention, said transparent transfer layer comprises a laminate of an intermediate transfer medium and a hologram transfer layer, said intermediate transfer medium comprising a protective layer, said hologram transfer layer comprising a hologram layer.

In the above embodiment of the present invention, said transparent transfer layer has been formed by stacking said hologram transfer layer comprising a hologram layer onto the intermediate transfer medium comprising a protective layer by a thermal transfer method.

In a preferred embodiment of the present invention, said hologram transfer layer comprising a hologram layer is stacked onto the intermediate transfer medium comprising a protective layer through a self-adhesive layer.

In the above embodiment of the present invention, said hologram transfer layer comprising a hologram layer is stacked onto the intermediate transfer medium comprising a protective layer through a pressure-sensitive adhesive layer.

In a preferred embodiment of the present invention, in the thermal transfer sheet, said hologram transfer layer is in a pattern form.

According to the present invention, there is provided a process for producing a thermal transfer sheet, characterized by comprising stacking a hologram transfer layer comprising a hologram layer onto an intermediate transfer medium comprising a protective layer provided on a base material sheet by a thermal transfer method.

According to the present invention, there is provided another process for producing a thermal transfer sheet, characterized by comprising stacking, through an adhesive layer, a volume hologram transfer layer comprising a hologram layer onto an intermediate transfer medium comprising a protective layer provided on a base material sheet.

According to the present invention, there is provided a further process for producing a thermal transfer sheet, characterized by comprising stacking, through a pressure-sensitive adhesive layer, a hologram transfer layer comprising a hologram layer onto an intermediate transfer medium comprising a protective layer provided on a base material sheet.

According to the present invention, there is provided an image formed object, characterized by being produced by the transfer of the above thermal transfer sheet.

The "hologram layer" as used herein includes a transfer layer having a relief hologram, an emboss hologram, a volume hologram, or other diffraction structure.

EFFECT OF THE INVENTION

The thermal transfer sheet according to the present invention comprises a hologram and can realize, for example, the prevention of forgery and alteration of articles such as credit cards, bank cards, and ID cards.

The present invention can realize the production of a thermal transfer sheet and thermal transfer treatment in a large quantity with high efficiency.

A hologram transfer sheet and an image formed object comprising a hologram layer can be produced at low cost with high efficiency by using the thermal transfer sheet comprising a patterned hologram transfer layer according to the present invention.

BRIEF DESCRIPTION OF THE DRAWINGS

FIG. 3 is a typical diagram showing a patch transfer sheet which is an embodiment of the thermal transfer sheet according to the present invention.

FIG. 4 is a typical diagram showing a face serial transfer sheet which is an embodiment of the thermal transfer sheet according to the present invention.

FIG. 5 is a typical diagram showing an intermediate transfer medium sheet which is an embodiment of the thermal transfer sheet according to the present invention.

FIG. 6 is a typical diagram showing an emboss hologram transfer sheet which is an embodiment of the thermal transfer sheet according to the present invention.

FIG. 7 is a typical diagram showing an emboss hologram intermediate transfer medium sheet which is an embodiment of the thermal transfer sheet according to the present invention.

DESCRIPTION OF REFERENCE CHARACTERS

Figure 1:
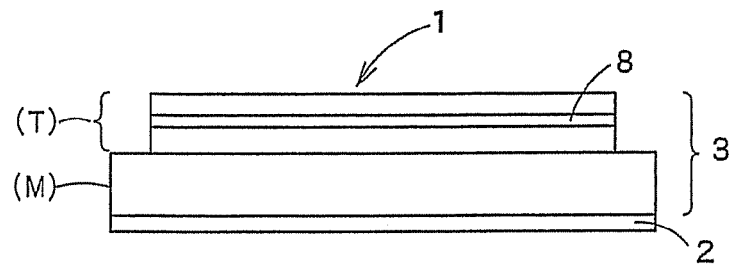
FIG. 1 is a typical cross-sectional view showing an embodiment of the thermal transfer sheet according to the present invention.

1: thermal transfer sheet
2: base material sheet
3: transparent transfer layer
4: peel layer
5: protective layer
6α: self-adhesive layer
6β: pressure-sensitive adhesive layer
6': adhesive layer-receptive layer
7: adhesive layer
8: volume hologram layer
9: adhesive layer
10: base material sheet
11: release layer
12: coloring material layer
13: backside layer
14: emboss hologram layer
15: vapor deposition layer
M: intermediate transfer medium comprising protective layer
T: volume hologram transfer layer comprising volume hologram layer

BEST MODE FOR CARRYING OUT THE INVENTION

Particularly preferred thermal transfer sheets according to the present invention will be described, if necessary, with reference to the accompanying drawings.

<Thermal Transfer Sheet>

The accompanying drawings are typical diagrams showing preferred embodiments of the thermal transfer sheet according to the present invention.

A thermal transfer sheet 1 according to the present invention shown in FIG. 1 comprises a base material sheet 2 and a transparent transfer layer 3 provided separably on the base material sheet 2. A volume hologram layer 8 is provided on at least a part of the transparent transfer layer 3.

When the thermal transfer sheet 1 shown in FIG. 1 is put on top of an article such as a card (not shown) followed by thermal transfer, the base material sheet 2 is separated from the transparent transfer layer 3 at the interface of the base material sheet 2 and the transparent transfer layer 3 and, further, the transparent transfer layer 3 is transferred onto the article such as a card. This transparent transfer layer 3 comprises a laminate of an intermediate transfer medium (M) comprising a protective layer, and a volume hologram transfer layer (T) comprising a volume hologram layer.

This transparent transfer layer 3 is preferably formed by stacking a volume hologram transfer layer (T) comprising a volume hologram layer onto an intermediate transfer medium (M) comprising a protective layer by a thermal transfer method.

Figure 2A:
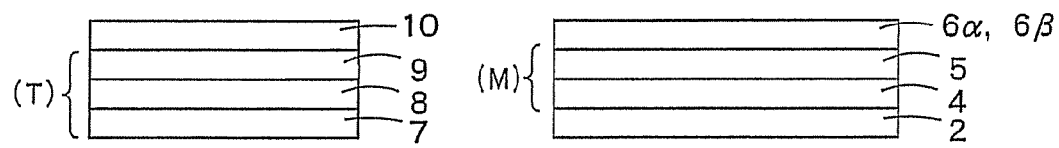
FIG. 2 is a typical diagram showing a protective layer thermal transfer sheet which is an embodiment of the thermal transfer sheet according to the present invention.
Figure 2B:
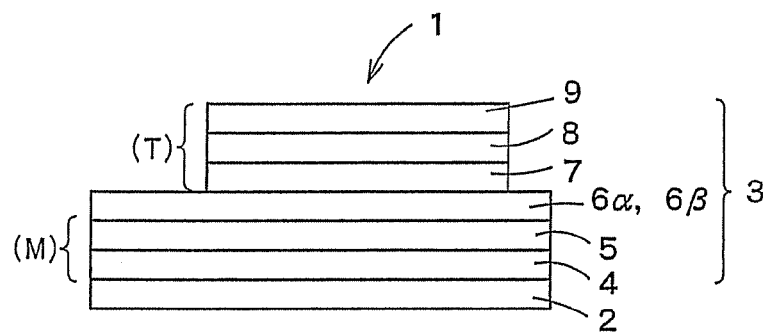
Figure 2C:
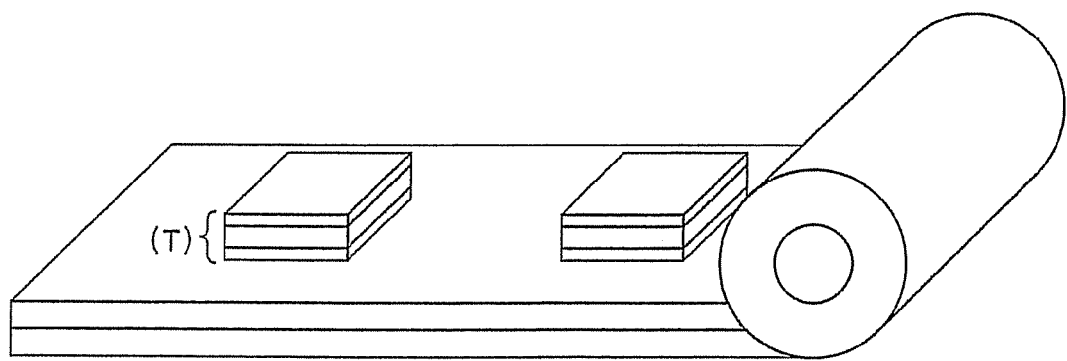

Preferred embodiments of the thermal transfer sheet 1 according to the present invention shown in FIG. 1 include, for example, a first embodiment regarding a protective layer transfer sheet (FIGS. 2 (*b*) and 2 (*c*)), a second embodiment regarding a patch transfer sheet (FIGS. 3 (*b*) and 3 (*c*)), a third embodiment regarding a face serial transfer sheet (FIGS. 4 (*b*) and 4 (*c*)), a fourth embodiment regarding an intermediate transfer medium (FIGS. 5 (*b*) and 5 (*c*)), a fifth embodiment regarding an emboss hologram transfer sheet (FIGS. 6 (*b*) and 6 (*c*)), and a sixth embodiment regarding an emboss hologram intermediate transfer medium (FIGS. 7 (*b*) and 7 (*c*)).

First Embodiment

Protective Layer Thermal Transfer Sheet

FIG. 2 (*b*) shows a specific preferred example of the first embodiment.

This thermal transfer sheet 1 shown in FIG. 2 (*b*) comprises a base material sheet 2 and a transparent transfer layer 3 provided separably on the base material sheet 2. A volume hologram transfer layer (T) comprising a volume hologram layer is stacked onto an intermediate transfer medium (M) comprising a protective layer through a self-adhesive layer 6α. The intermediate transfer medium (M) comprising a protective layer comprises a peel layer 4 and a protective layer 5, and the volume hologram transfer layer (T) comprising a volume hologram layer comprises an adhesive layer 7, a volume hologram layer 8, and an adhesive layer 9. A pressure-sensitive adhesive layer 6β may be used instead of the self-adhesive layer 6α.

The thermal transfer sheet 1 shown in FIG. 2 (*b*) may be formed by putting an assembly comprising a base material sheet 2 and, provided on the base material sheet 2, an intermediate transfer medium (M) comprising a protective layer and a self-adhesive layer 6α (or a pressure-sensitive adhesive layer 6β), and an assembly comprising a base material sheet 10 and, provided on the base material sheet 10, a volume hologram transfer layer (T) comprising a volume hologram layer, as shown in FIG. 2 (*a*), onto top of each other to bond both the sheets (M) and (T) to each other and then removing the base material sheet 10.

FIG. 2 (*c*) is a typical perspective view showing the thermal transfer sheet 1 shown in FIG. 2 (*b*).

In the transfer of the transparent transfer layer 3 in the first embodiment onto a final image formed object, heating is carried out by T/H or the like from the backside of the base material sheet 2 to separate the peel layer 4 from the protective layer 5 at the interface of the peel layer 4 and the protective layer 5, and the assembly on its part located on the protective layer is transferred in any desired form onto the final image formed object.

An indispensable construction has been described above. However, a construction may be adopted in which, depending upon materials constituting each layer and the like, the interposition of other intermediate layer and the like is possible, or each layer may be formed in a two layer structure by varying materials and the like.

Second Embodiment

Patch Transfer Sheet

In the first embodiment, regarding the part of the intermediate transfer medium comprising a protective layer, the protective layer is provided by coating. On the other hand, in the patch transfer sheet in the second embodiment, a protective sheet such as PET is previously half cut or fusion cut into a predetermined size, followed by stacking. In transfer onto a final image formed object, separation takes place at the interface of the peel layer 4 and the protective sheet 5, and the assembly in its part including the protective sheet is transferred onto the final image formed object.

In FIG. 3 (c) which will be described later, the assembly in its part located on and including the protective layer 5 is transferred onto the final image formed object.

FIG. 3 (b) shows a preferred specific example of the second embodiment.

This thermal transfer sheet 1 shown in FIG. 3 (b) comprises a base material sheet 2 and a transparent transfer layer 3 provided separably on the base material sheet 2. A volume hologram transfer layer (T) comprising a volume hologram layer is stacked onto an intermediate transfer medium (M) comprising a protective layer through a self-adhesive layer 6α. The intermediate transfer medium (M) comprising a protective layer comprises a peel layer 4 and a protective layer 5, and the volume hologram transfer layer (T) comprising a volume hologram layer comprises an adhesive layer 7, a volume hologram layer 8, and an adhesive layer 9. A pressure-sensitive adhesive layer 6β may be used instead of the self-adhesive layer 6α.

The thermal transfer sheet 1 shown in FIG. 3 (b) may be formed by putting an assembly comprising a base material sheet 2 and, provided on the base material sheet 2, an intermediate transfer medium (M) comprising a protective layer and a self-adhesive layer 6α (or a pressure-sensitive adhesive layer 6β), and an assembly comprising a base material sheet 10 and, provided on the base material sheet 10, a volume hologram transfer layer (T) comprising a volume hologram layer, as shown in FIG. 3 (a), onto top of each other to bond both the sheets (M) and (T) to each other and then removing the base material sheet 10.

FIG. 3 (c) is a typical perspective view showing the thermal transfer sheet 1 shown in FIG. 3 (b).

Third Embodiment

Face Serial Transfer Sheet

FIG. 4 (b) shows a preferred specific example of the third embodiment.

This thermal transfer sheet 1 shown in FIG. 4 (b) comprises a base material sheet 2 and a transparent transfer layer 3 provided separably on the base material sheet 2. A volume hologram transfer layer (T) comprising a volume hologram layer is stacked onto an intermediate transfer medium (M) comprising a protective layer through a self-adhesive layer 6α. The intermediate transfer medium (M) comprising a protective layer comprises a release layer 11 and a protective layer 5, and the volume hologram transfer layer (T) comprising a volume hologram layer comprises an adhesive layer 7, a volume hologram layer 8, and an adhesive layer 9. A pressure-sensitive adhesive layer 6β may be used instead of the self-adhesive layer 6α.

A coloring material layer 12 (12Y, 12M, 12C) is provided on the base material sheet 2 on its face part free from the intermediate transfer medium (M) comprising a protective layer. If necessary, a backside layer 13 may be provided on the base material sheet 2 on its opposite side.

Further, if necessary, the base material sheet 2 may be subjected to easy adhesion treatment to improve the strength of adhesion between the base material sheet 2 and the coloring material layer 12.

The thermal transfer sheet 1 shown in FIG. 4 (b) may be formed by putting an assembly comprising a base material sheet 2 and, provided on the base material sheet 2, an intermediate transfer medium (M) comprising a protective layer and a self-adhesive layer 6α (or a pressure-sensitive adhesive layer 6β), and an assembly comprising a base material sheet 10 and, provided on the base material sheet 10, a volume hologram transfer layer (T) comprising a volume hologram layer, as shown in FIG. 4 (a), onto top of each other to bond both the sheets (M) and (T) to each other and then removing the base material sheet 10.

FIG. 4 (c) is a typical perspective view of the thermal transfer sheet 1 shown in FIG. 4 (b).

Fourth Embodiment

Adhesive Layer-Receptive Layer Type

FIG. 5 (b) shows a preferred specific example of the fourth embodiment.

This thermal transfer sheet 1 shown in FIG. 5 (b) comprises a base material sheet 2 and a transparent transfer layer 3 provided separably on the base material sheet 2. A volume hologram transfer layer (T) comprising a volume hologram layer is stacked onto an intermediate transfer medium (M) comprising a protective layer through an adhesive layer-receptive layer 6'. The intermediate transfer medium (M) comprising a protective layer comprises a peel layer 4 and a protective layer 5, and the volume hologram transfer layer (T) comprising a volume hologram layer comprises an adhesive layer 7, a volume hologram layer 8, and an adhesive layer 9.

Characters, figures, identification symbols or the like may be provided using ink or the like on the adhesive layer-receptive layer 6' in its top face part 6" free from the volume hologram transfer layer (T) comprising a volume hologram layer.

The thermal transfer sheet 1 shown in FIG. 5 (b) may be formed by putting an assembly comprising a base material sheet 2 and, provided on the base material sheet 2, an intermediate transfer medium (M) comprising a protective layer and an adhesive layer-receptive layer 6', and an assembly comprising a base material sheet 10 and, provided on the base material sheet 10, a volume hologram transfer layer (T) comprising a volume hologram layer, as shown in FIG. 5 (a), onto top of each other to bond both the sheets (M) and (T) to each other and then removing the base material sheet 10.

FIG. 5 (c) is a typical perspective view of the thermal transfer sheet 1 shown in FIG. 5 (b).

Fifth Embodiment

Emboss Hologram Transfer Sheet

FIG. 6 (b) shows a preferred specific example of the fifth embodiment.

This thermal transfer sheet 1 shown in FIG. 6 (b) comprises a base material sheet 2 and a transparent transfer layer 3 provided separably on the base material sheet 2. A volume hologram transfer layer (T) comprising a volume hologram layer is stacked onto an intermediate transfer medium (M) comprising a protective layer through a self-adhesive layer 6α. The intermediate transfer medium (M) comprising a protective layer comprises a peel layer 4, a protective layer 5, an emboss hologram layer 14, and a vapor deposition layer 15, and the volume hologram transfer layer (T) comprising a volume hologram layer comprises an adhesive layer 7, a volume hologram layer 8, and an adhesive layer 9. A pressure-sensitive adhesive layer 6β may be used instead of the self-adhesive layer 6α.

The thermal transfer sheet 1 shown in FIG. 6 (b) may be formed by putting an assembly comprising a base material sheet 2 and, provided on the base material sheet 2, an intermediate transfer medium (M) comprising a protective layer and a self-adhesive layer 6α (or a pressure-sensitive adhesive layer 6β), and an assembly comprising a base material sheet 10 and, provided on the base material sheet 10, a volume hologram transfer layer (T) comprising a volume hologram layer, as shown in FIG. 6 (*a*), onto top of each other to bond both the sheets (M) and (T) to each other and then removing the base material sheet 10.

In this fifth embodiment, two types of hologram layers of a volume hologram layer 8 and an emboss hologram layer 14 are provided. The effect of preventing forgery and alteration can be further improved by the synergistic effect of steric configuration of the two types of hologram layers. Processing called emboss hologram processing, which can be generally carried out in an easy and low-cost manner, can significantly improve the effect of preventing the forgery and alteration.

In FIG. 6 (*b*), the emboss hologram layer 14 is provided on the whole area of the intermediate transfer medium (M) comprising a protective layer. Alternatively, the emboss hologram layer 14 may be provided on a part of the intermediate transfer medium (M) comprising a protective layer.

FIG. 6 (*c*) is a typical perspective view of the thermal transfer sheet 1 shown in FIG. 6 (*b*).

Sixth Embodiment

Emboss Hologram Intermediate Transfer Medium

FIG. 7 (*b*) shows a preferred specific example of the sixth embodiment.

This thermal transfer sheet 1 shown in FIG. 7 (*b*) comprises a base material sheet 2 and a transparent transfer layer 3 provided separably on the base material sheet 2. A volume hologram transfer layer (T) comprising a volume hologram layer is stacked onto an intermediate transfer medium (M) comprising a protective layer through an adhesive layer-receptive layer 6'. The intermediate transfer medium (M) comprising a protective layer comprises a peel layer 4 and a protective layer 5, an emboss hologram layer 14 and a vapor deposition layer 15 and the volume hologram transfer layer (T) comprising a volume hologram layer comprises an adhesive layer 7, a volume hologram layer 8, and an adhesive layer 9.

Characters, figures, identification symbols or the like may be provided using ink or the like on the adhesive layer-receptive layer 6' in its top face part 6" free from the volume hologram transfer layer (T) comprising a volume hologram layer.

The thermal transfer sheet 1 shown in FIG. 7 (*b*) may be formed by putting an assembly comprising a base material sheet 2 and, provided on the base material sheet 2, an intermediate transfer medium (M) comprising a protective layer and an adhesive layer-receptive layer 6', and an assembly comprising a base material sheet 10 and, provided on the base material sheet 10, a volume hologram transfer layer (T) comprising a volume hologram layer, as shown in FIG. 7 (*a*), onto top of each other to bond both the sheets (M) and (T) to each other and then removing the base material sheet 10.

In this sixth embodiment, two types of hologram layers of a volume hologram layer 8 and an emboss hologram layer 14 are provided. The effect of preventing forgery and alteration can be further improved by the synergistic effect of steric configuration of the two types of hologram layers. Emboss hologram processing can be generally carried out in an easy and low-cost manner. Therefore, the formation of the emboss hologram on the whole area of the thermal transfer sheet (M) is not very disadvantageous in terms of production cost.

Characters, figures, identification symbols or the like may be provided using ink or the like on the adhesive layer-receptive layer 6' in its top face part 6" free from the volume hologram transfer layer (T) comprising a volume hologram layer.

FIG. 7 (*c*) is a typical perspective view of the thermal transfer sheet 1 shown in FIG. 7 (*b*).

<Production of the Thermal Transfer Sheet>

The thermal transfer sheet according to the present invention may be formed by any desired method. For example, the thermal transfer sheet may be formed by successively coating or stacking, on any one of the above layers, other layers, or by uniting multilayer structures comprising two or more layers previously formed by coating or stacking, that is, an information material thermal transfer sheet (M) and a volume hologram transfer layer (T) comprising a volume hologram layer, with each other.

In the present invention, the thermal transfer sheet may be formed by putting an assembly comprising a base material sheet 2 and, provided on the base material sheet 2, an intermediate transfer medium (M) comprising a protective layer, and an assembly comprising a base material sheet 10 and, provided on the base material sheet 10, a volume hologram transfer layer (T) comprising a volume hologram layer, preferably, for example, as shown in FIGS. 1 to 7 (*a*), onto top of each other to bond both the sheets (M) and (T) to each other and then removing the base material sheet 10.

<Hologram Layer>

A hologram is generally a record of an interference pattern of light in which light interference fringes are recorded in the form of transmittance modulation and refractive index modulation to form a three-dimensional image.

The volume hologram layer in the present invention may be formed, for example, by coating of a volume hologram recording material. Volume hologram recording materials usable herein include, for example, a material for dry volume phase-type hologram recording, comprising a matrix polymer, a photopolymerizable compound, a photopolymerization initiator, a sensitizing dye, a plasticizer and the like. Further, the volume hologram recording material may contain, for example, a silver salt emulsion, a dichromate gelatin emulsion, a photopolymerizable resin, and a photocrosslinkable resin.

The volume hologram layer is generally provided on a part of the sheet, or alternatively may be provided on the whole area of the sheet.

<Base Material Sheet>

Base material sheets which have hitherto been used in thermal transfer sheets, maybe used, either as such or after necessary modification, as the base material sheet in the thermal transfer sheet according to the present invention. In the present invention, preferred base material sheets include sheets of resin materials, for example, (i) polyesters, preferably polyethylene terephthalate or polyethylene naphthalate, polycarbonates, polyamides, polyimides, cellulose acetate, polyvinylidene chloride, polyvinyl chloride, polystyrene, fluororesins, polypropylene, polyethylene, and ionomers, and (ii) papers, for example, glassine paper, capacitor paper, and paraffin paper. The base material sheet may be formed of two or more of them. The base material sheet is separated after the transfer of the thermal transfer sheet according to the present invention onto an object such as a card. Accordingly, in general, the base material sheet per se is not required to be transparent. This base material sheet, however, should have satisfactory heat resistance and strength so that the thermal transfer sheet according to the present invention can be transferred well onto printed matter.

Therefore, in the present invention, materials having excellent heat resistance and strength, particularly polyethylene terephthalate and polyethylene naphthalate, are preferred.

The thickness of the base material sheet may be properly determined by taking into consideration, for example, necessary strength and heat resistance depending upon specifically used materials and objects for the thermal transfer and thermal transfer conditions. In the present invention, for example, when polyethylene terephthalate is used, the thickness is preferably, for example, 2.5 to 100 μm.

<Self-Adhesive Layer>

Self-adhesives for the self-adhesive layer include various self-adhesives, for example, acrylic resins, acrylic ester resins, or their copolymers, styrene-butadiene copolymer, natural rubber, casein, gelatin, rosin esters, terpene resins, phenolic resins, styrene resins, chromane-indene resins, polyvinyl ether, silicone resins, and α-cyanoacrylate-based, silicone-based, maleimide-based, styrol-based, polyolefin-based, and resorcinol-based self-adhesives.

<Adhesive Layer>

The adhesive layer may be formed of various compounds. Examples of preferred compounds in the adhesive layer in the present invention include polyester resins, polyamide resins, acrylic resins, vinyl chloride resins, vinyl acetate resins, vinyl chloride-vinyl acetate copolymer resins, styrene-acryl copolymer resins, urethane resins, and epoxy resins. Among them, polyester resins are particularly preferred.

The thickness of the adhesive layer is preferably 0.1 to 5 μm, particularly preferably 0.3 to 3 μm.

<Protective Layer>

In the thermal transfer sheet according to the present invention, materials usable for the protective layer include transparent resins, preferably for example, polyethylene, polypropylene, polyethylene fluoride, polyvinylidene fluoride, polyvinyl chloride, polyvinylidene chloride, ethylene-vinyl alcohol, polyvinyl alcohol, polymethyl methacrylate, polyether sulfone, polyether ether ketone, polyamides, tetrafluoroethylene-perfluoroalkyl vinyl ether, polyethylene tetrephthalate, and polyimides.

<Release Layer>

In the present invention, the thermal transferability can be improved by providing a release layer. This release layer should be constructed so that, upon thermal transfer, the release layer stays on the base material sheet side, that is, is not adhered and does not stay onto an object such as a card. In particular, when a coloring material layer is provided on a base material sheet which has been subjected to easy adhesion treatment as in the face serial transfer sheet in the third embodiment, the release layer is effective in improving the separation between the base material sheet and the transparent transferable sheet.

This release layer may be formed of, for example, at least one of waxes, silicone wax, silicone resins, fluororesins, acrylic resins, polyvinyl alcohol resins, cellulose derivative resins, urethane resins, acetic acid-based vinyl resins, acryl vinyl ether resins, and maleic anhydride resins, or copolymers or mixtures thereof.

The thickness of the release layer is preferably 0.2 to 1.5 μm, particularly preferably 0.3 to 1 μm.

<Backside Layer>

The backside layer contributes to the prevention of fusing of the thermal transfer sheet to a thermal head, a heating roll or the like in the thermal transfer, improved slipperiness, prevention of static charges, and enhanced rigidity of the thermal transfer sheet to prevent expansion and contraction for easy positioning of the protective layer thermal transfer sheet.

Materials for the backside layer include, for example, materials which have hitherto been used in the field of thermal transfer films, preferably, for example, silicone resins, polyvinylbutyral resins, polyvinylacetoacetal resins, polyester resins, polyether resins, polybutadiene resins, styrene-butadiene resins, acryl polyols, polyurethane acrylate, polyester acrylate, polyether acrylate, epoxy acrylate, prepolymers of urethane or epoxy, nitrocellulose resins, cellulose nitrate resins, cellulose acetopropionate resins, cellulose acetate butyrate resins, cellulose acetate hydrogenphthalate resins, cellulose acetate resins, aromatic polyamide resins, polyimide resins, polyamide-imide resins, polycarbonate resins, and chlorinated polyolefin resins.

Further, in order to improve the heat resistance and coating strength of the backside layer and the adhesion between the backside layer and the base material sheet, a cured product obtained by a reaction between a thermoplastic resin containing a reactive group in the resin and a polyisocyanate, or a product of a reaction with an unsaturated bond-containing monomer or oligomer may be used. The method for curing is not particularly limited, and, for example, heating or ionizing radiation irradiation may be used.

Slipperiness imparting agents which can be added to the backside layer formed of the above resin or can be coated onto the backside layer, include phosphoric esters, silicone oils, graphite powder, silicone graft polymers, fluorograft polymers, acrylsilicone graft polymers, acrylsiloxane, arylsiloxane or other silicone polymers. A layer formed of a polyol, for example, a polyalcohol polymer compound, a polyisocyanate compound and a phosphoric ester compound is preferred, and, more preferably, a filler is added.

The thickness of the backside layer is preferably 0.1 to 3 μm, particularly preferably 0.1 to 2 μm.

<Coloring Material Layer>

In the present invention, a thermally sublimable coloring material layer or a heat-fusion coloring material layer may be further provided. According to this construction, simultaneously with or independently of the thermal transfer of the thermal transfer sheet according to the present invention onto an object such as a card, a coloring material can be adhered onto the object such as a card. Thus, a character, a figure or other pattern can be formed on the surface of the object such as a card.

For example, the following coloring material layers may be successively formed.

(i) Yellow dye layer/magenta dye layer/cyan dye layer/thermally transferable protective layer (ii) Yellow dye layer/magenta dye layer/cyan dye layer/black dye layer/thermally transferable protective layer (iii) Yellow dye layer/magenta dye layer/cyan dye layer/black fusion-ink layer/thermally transferable protective layer (iv) Black dye layer/thermally transferable protective layer (v) Black fusion-ink layer/thermally transferable protective layer (vi) Yellow fusion-ink layer/magenta fusion-ink layer/cyan fusion-ink layer/thermally transferable protective layer The above coloring material layers and their forming methods per se are known in the art, and, in the present invention, suitable coloring materials and forming methods may be properly selected from such conventional coloring materials and forming methods.

<Emboss Hologram Layer>

The emboss hologram layer in the thermal transfer sheet according to the present invention may be formed of, for example, a resin film which has been embossed so as to form a hologram.

<Ultraviolet Absorbing Material>

In the thermal transfer sheet according to the present invention, if necessary, an ultraviolet absorber can be used. When a layer containing the ultraviolet absorber is used, a change in properties/deterioration of the printed matter and the transfer layer per se upon exposure to ultraviolet light contained in sunlight or the like can be prevented or suppressed.

This ultraviolet absorber can be incorporated in any one layer or at least two layers present on the printed matter after the transfer. Alternatively, the ultraviolet absorber may be incorporated in a layer provided separately from the above water absorptive layer, intermediate layer, and adhesive layer.

Conventional various compounds may be used as the ultraviolet absorber. Examples of preferred ultraviolet absorbers include organic ultraviolet absorbers, for example, benzophenone compounds, benzotriazole compounds, oxalanilide compounds, cyanoacrylate compounds, salicylate compounds, and inorganic ultraviolet absorbers, for example, oxides of zinc, titanium, cerium, tin, and iron.

The amount of the ultraviolet absorber incorporated is preferably 10 to 40% by weight, particularly preferably 25 to 35% by weight, based on all the layers containing the ultraviolet absorber in the laminate structure.

<Thermal Transfer>

The thermal transfer sheet according to the present invention may be thermally transferred onto an object such as a card by any method without particular limitation, and any conventional method may be adopted so far as thermal transfer can be carried out well. In the transfer of the thermal transfer sheet onto a printed matter, heating of the thermal transfer sheet, pressure bonding between the protective layer thermal transfer sheet and the printed matter, and the separation of the base material sheet are necessary.

These may be carried out as separate steps, or alternatively may be simultaneously carried out, if possible. Further, in this case, conventional devices may be adopted. For example, thermal printers, hot rolls, line heaters, and hot stampers may be used.

EXAMPLES

Example 1

The following Examples further illustrate the present invention. However, it should be noted that the present invention is not limited to these Examples.

(1) Preparation of Intermediate Transfer Medium

A coating liquid for peel layer formation having the following composition was coated onto a 6 μm-thick PET film (Lumirror, manufactured by Toray Industries, Inc.), and the coating was dried to form a peel layer. The thickness of the peel layer was 0.7 g/m² on a dry basis.

| <Composition of coating liquid for peel layer formation> | |
| --- | --- |
| Polyvinyl alcohol | 17.0 wt % |
| Polyurethane | 13.0 wt % |
| Water | 23.3 wt % |
| Solmix | 46.7 wt % |

Next, a protective layer was formed by coating a coating liquid for protective layer formation having the following composition onto the peel layer and drying the coating. The thickness of the protective layer was 1.0 g/m² on a dry basis.

| <Composition of coating liquid for protective layer formation> | |
| --- | --- |
| Acrylic resin | 29.5 wt % |
| Slip agent (polyethylene wax) | 0.5 wt % |
| Methyl ethyl ketone | 35.0 wt % |
| Toluene | 35.0 wt % |

Next, an adhesive layer was formed by coating a coating liquid for adhesive layer formation having the following composition onto the protective layer and drying the coating. The thickness of the adhesive layer was 1.6 g/m² on a dry basis.

| <Coating liquid for adhesive layer formation> | |
| --- | --- |
| Acrylic ester copolymer | 20.0 wt % |
| Vinyl chloride-vinyl acetate copolymer | 15.0 wt % |
| Methyl ethyl ketone | 32.5 wt % |
| Toluene | 32.5 wt % |

Thus, an intermediate transfer medium having a laminate construction of PET film/peel layer/protective layer/adhesive layer was prepared.

(2) Formation of Volume Hologram Transfer Layer

At the outset, a laminate A having a laminate construction of PET film/hologram recording layer/separable PET film (HRF800x001, manufactured by Du Pont) was provided.

Next, a solution of 60 parts by weight of an ethylene-vinyl acetate copolymer (EC1700, manufactured by Chuo Rika Kogyo Corporation) dissolved in 40 parts by weight of isopropyl alcohol was gravure coated onto the same PET film as used above, and the coating was dried to form a laminate B having an adhesive layer. The thickness of the adhesive layer was 3 μm on a dry basis.

Next, a solution of 60 parts by weight of an ethylene-vinyl acetate copolymer (EC1700, manufactured by Chuo Rika Kogyo Corporation) dissolved in 40 parts by weight of isopropyl alcohol was gravure coated onto the same separable PET film as used above, and the coating was dried to form a laminate C having a first adhesive layer. The thickness of the first adhesive layer was 3 μm on a dry basis.

The laminate A was irradiated with a laser beam with a wavelength of 514 nm to record a Lippmann hologram in a hologram record layer, followed by heating at 100° C. for 10 min. Next, the separable PET film in the laminate A was separated from the laminate A. The laminate B on its adhesive layer side was applied onto the separated face in the laminate A, and hot lamination was carried out at 80° C. to apply the laminate A and the laminate B to each other. Thus, a laminate D having a laminate construction of PET film/adhesive layer/volume hologram layer/PET film was prepared.

Next, the laminate D was irradiated with light from a high-pressure mercury lamp for fixation of the volume hologram. Thereafter, the PET film on its side in contact with the volume hologram layer was separated from the laminate, and the laminate C on its first adhesive layer side was applied onto the separated face, followed by hot lamination at 100° C. to apply the laminate D and the laminate C to each other. Thus, a transparent volume hologram transfer layer having a laminate construction of PET film/adhesive layer/volume hologram layer/first adhesive layer/separable PET film was prepared.

(3) Preparation of Thermal Transfer Sheet

The separable PET film in the volume hologram transfer layer obtained above was separated, and the above intermediate transfer medium on its adhesive layer side was applied to the separated face (that is, first adhesive layer face), and the volume hologram transfer layer and the intermediate transfer medium were applied to each other with TP-701S HEAT SEAL TESTER (manufactured by TESTER SANGYO). Heat seal conditions were as follows.

| <Heat seal conditions> | |
| --- | --- |
| Pressing time | 17 sec |
| Set temperature | 130° C. |
| Pressure | 2 kgf/cm$^2$ |

Next, the PET film provided on the volume hologram transfer layer side was separated from the laminate of the volume hologram transfer layer and the intermediate transfer medium. Thus, a protective layer thermal transfer sheet having a laminate construction of PET film/peel layer/protective layer/adhesive layer/first adhesive layer/volume hologram layer/adhesive layer was prepared.

(4) Example of Thermal Transfer onto Card

The adhesive layer in the thermal transfer sheet prepared above was applied to a PVC card (manufactured by Dai Nippon Printing Co., Ltd.), and lamination was carried out under the following conditions.

<Lamination Conditions>
Laminating apparatus: VDS CX-710 printer
Printing conditions: printing of a sample image under standard printing conditions (test print mode)
Heat roll temp.: 190° C. (set value)
Printing speed: about 30 nm/sec
Pressure: 1 to 3 kgf/cm$^2$ (estimated value)

In this Example, lamination was carried out under the above conditions. Alternatively, a PVC card, on which an image has been previously printed by a dye sublimation thermal transfer printer, may be used.

After the lamination of the thermal transfer sheet onto a PVC card as described above, the PET film in the thermal transfer sheet was separated to prepare a card comprising a volume hologram with a protective layer.

Comparative Example 1

(1) Example of Thermal Transfer Using Thermal Transfer Sheet not Provided with Protective Layer The separable PET film in the volume hologram transfer layer prepared in Example 1 was separated, and the same PVC card as used in Example 1 was applied to the separated face (that is, the first adhesive layer face), followed by lamination under the following conditions.

<Lamination Conditions>
Laminating apparatus: VDS CX-710 printer
Printing conditions: printing of a sample image under standard printing conditions (test print mode)
Heat roll temp.: 190° C. (set value)
Printing speed: about 30 nm/sec
Pressure: 1 to 3 kgf/cm$^2$ (estimated value)

After the lamination of the thermal transfer sheet free from a protective layer onto a PVC card as described above, the PET film in the thermal transfer sheet was separated to prepare a protective layer-free card comprising a volume hologram.

EVALUATION

The cards having a volume hologram prepared in Example 1 and Comparative Example 1 were visually observed. As a result, a deep-feel hologram image could be observed.

Next, the cards having a volume hologram prepared in Example 1 and Comparative Example 1 were evaluated for abrasion resistance. An abrasive wheel was rotated 300 times on each card, and the evaluation of the abrasion resistance was then carried out by visual inspection for damage to the image on the card.

Evaluation conditions were as follows.
Tester: ROTARY ABRATION TESTER (manufactured by Toyo Seiki)
Abrasive wheel: CS-10
Load: 500 g
The results were as shown below.
Card of Example 1: No damage to image was observed.
Card of Comparative Example 1: Damage to image was observed.

The invention claimed is:

1. A thermal transfer sheet comprising:
a base material sheet; and
transparent transfer layers provided separably on the base material sheet, the transparent transfer layers comprise an intermediate transfer medium comprising a protective layer, and a hologram transfer layer provided on less than the entirety of the intermediate transfer medium;
wherein the hologram transfer layer comprises a hologram layer, and the protective layer is coated with an emboss hologram layer, a vapor deposition layer and one of an adhesive layer-receptive layer and an adhesive layer on which said hologram transfer layer is provided.

2. A thermal transfer sheet according to claim 1, wherein said hologram transfer layer is in a pattern form.

3. A thermal transfer sheet according to claim 1, wherein said intermediate transfer medium can absorb ultraviolet light.

4. A thermal transfer sheet according to claim 1, wherein said adhesive layer is a self-adhesive layer.

5. A thermal transfer sheet according to claim 1, wherein said adhesive layer is a pressure-sensitive layer.

6. A process for producing a thermal transfer sheet according to claim 1, comprising stacking said hologram transfer layer onto said intermediate transfer medium by a thermal transfer method.

7. A process for producing a thermal transfer sheet according to claim 1, comprising stacking, through said adhesive layer—receptive layer or said adhesive layer, said hologram transfer layer onto said intermediate transfer medium.

8. A process for producing a thermal transfer sheet according to claim 1, comprising stacking, through a pressure sensitive adhesive layer, said hologram transfer layer onto said intermediate transfer medium.

9. An image formed object produced by the transfer of a thermal transfer sheet according to claim 1.

* * * * *